United States Patent [19]
Eberhardt

[11] Patent Number: 5,447,120
[45] Date of Patent: Sep. 5, 1995

[54] DISPENSER FOR BALES OF HAY

[76] Inventor: Norman C. Eberhardt, Box 281 #84 Hwy. 213 N., Cut Bank, Mont. 59427

[21] Appl. No.: 237,392

[22] Filed: May 3, 1994

[51] Int. Cl.6 .............................................. A01K 5/02
[52] U.S. Cl. ................................ 119/51.13; 119/51.14
[58] Field of Search ............... 119/51.11, 51.04, 51.13, 119/51.14, 51.15; 222/650, 638; 221/12, 15

[56] References Cited

U.S. PATENT DOCUMENTS

| | | | |
|---|---|---|---|
| 245,795 | 8/1881 | Dias | 119/51.13 |
| 983,919 | 2/1911 | McGuigan | 119/51.11 |
| 1,442,382 | 1/1923 | Bullock | 119/51.13 |
| 3,225,742 | 12/1965 | Hagan | 119/51.11 |
| 3,683,859 | 8/1972 | Kirk | 119/51.13 |
| 3,845,744 | 11/1974 | Carr et al. | 119/51.13 |
| 3,884,189 | 5/1975 | Ruth | 119/51.13 |

FOREIGN PATENT DOCUMENTS

| | | | |
|---|---|---|---|
| 451244 | 10/1927 | Germany | 119/51.04 |
| 206577 | 11/1923 | United Kingdom | 119/51.13 |

Primary Examiner—Todd E. Manahan
Attorney, Agent, or Firm—Young & Thompson

[57] ABSTRACT

A dispenser for bales of hay, comprising a fixed frame defining a plurality of compartments each adapted to receive a bale or part of a bale of hay. A front door closes all the compartments. A trap door is mounted for vertical swinging movement below each compartment about a horizontal axis on the frame between a raised position in which the trap door serves as a bottom for the compartment and is adapted to support a bale of hay in the compartment, and a lowered position in which the bale of hay is dispensed from the bottom of the compartment. A rod is mounted for rotation on the frame about an axis parallel to the horizontal axis. A lug on the trap door is engageable with a lug on the rod when the rod is rotated to a first position, the lugs being out of engagement with each other and the trap door free to fall when the rod is rotated to a second position. A retainer releasably retains the rod in the first position. A solenoid has a plunger which is moved upon actuation of the solenoid. Responsive to movement of the plunger, the retainer is disabled, thereby to permit the lug on the trap door to press downward and disengage from the lug on the rod thereby to rotate the rod the first position to the second position and to permit the trap door to fall open to dispense the bale or part bale of hay. A timer selectively predetermines the time of actuation of the solenoid.

2 Claims, 4 Drawing Sheets

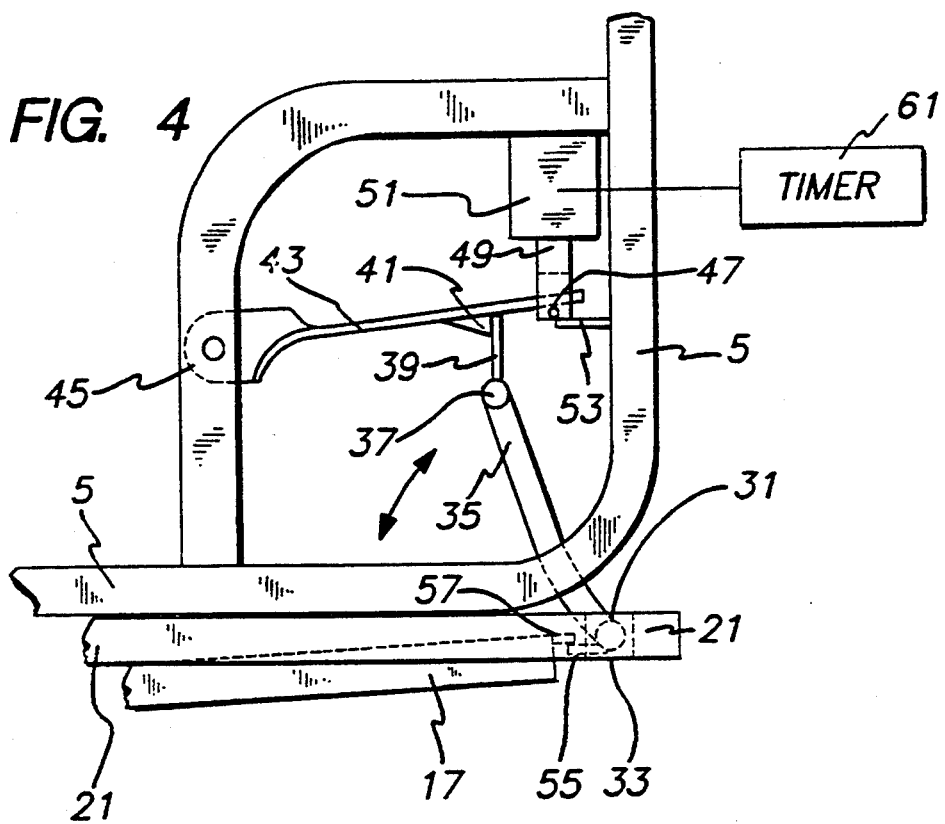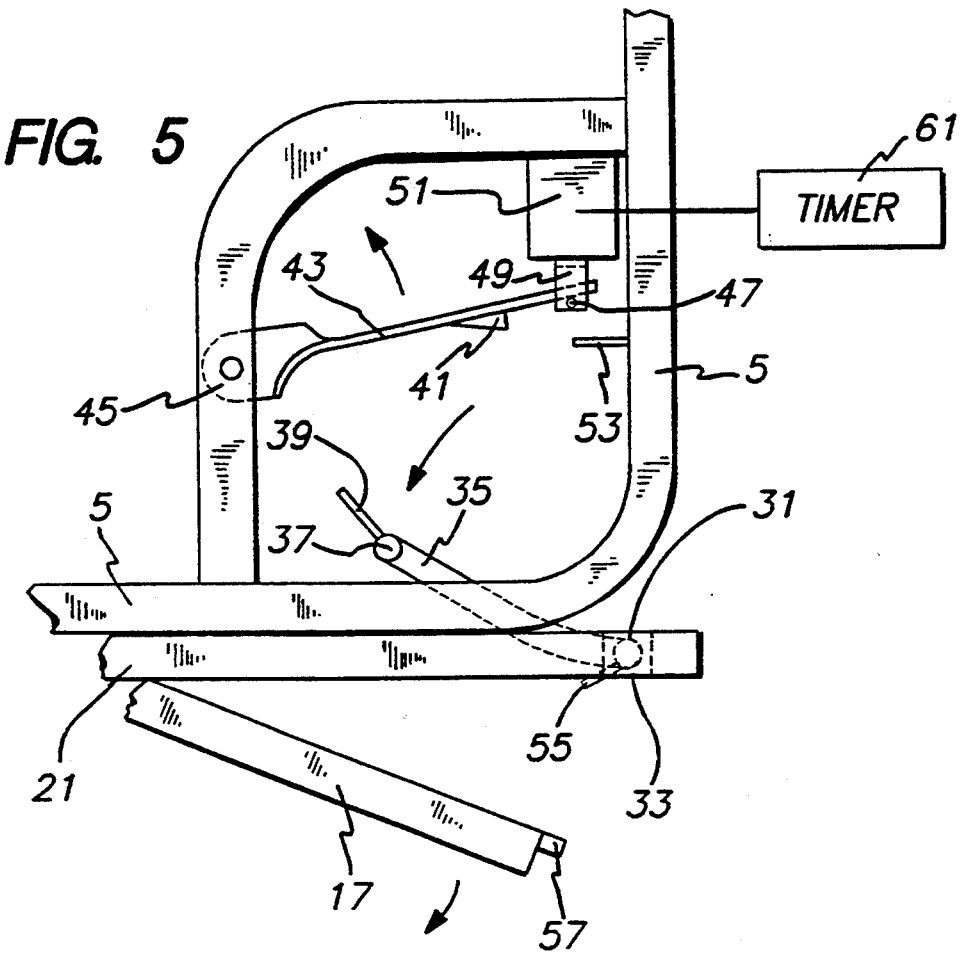

DISPENSER FOR BALES OF HAY

FIELD OF THE INVENTION

The present invention relates to a dispenser for bales of hay, whereby the bales may be automatically dispensed in timed sequence for consumption by animals, e.g. horses. In this way, it is not necessary for a worker to be present for each feeding.

BACKGROUND OF THE INVENTION

Owners of several animals, e.g. horses, often feel themselves constrained to be present every day for the feeding of the animals. Large ranching operations do not encounter this problem: there, sufficient employees are available that no one is hindered by having to observe a feeding schedule without relief from other workers. But the owner of only several animals, unassisted by others, may feel himself obliged to be present every day for feeding; and of course this a great burden on the owner.

THE KNOWN PRIOR ART

It would be desirable to provide automatic feeding devices for animals such as horses, whereby the food, e.g. hay, is automatically dispensed at timed intervals. Such devices have in fact been devised; and a representative showing of such devices is to be found in the following U.S. Pat. Nos.: 211,773, 245,795, 1,405,431, 1,561,656, 2,711,217, 3,060,891 and 3,683,859.

These and similar known devices, however, suffer from a number of drawbacks. In the first place, they tend to be quite bulky and to occupy a great deal of space that could be put to better use. In the second place, they tend to be complicated in construction, which increases their cost; and in the third place, they tend to malfunction easily, and this malfunctioning requires both time and expense to correct.

OBJECTS OF THE INVENTION

It is accordingly an object of the invention, to provide a dispenser for bales of hay, for animal feeding purposes, which will be small in size and so positioned as to occupy a minimum of space.

Another object of the present invention is the provision of a dispenser for bales of hay, which will be simple in construction and relatively low in cost.

Still another object of the present invention is the provision of a dispenser for bales of hay, which will be reliable in operation and resistant to malfunction.

A further object of the present invention is the provision of a dispenser for bales of hay, which can be quickly and easily reloaded and reset for subsequent timed operation.

Finally, it is an object of the present invention to provide a dispenser for bales of hay, which will be easy to operate and rugged and durable in use.

BRIEF DESCRIPTION OF THE DRAWINGS

These and other objects of the present invention will become apparent from a consideration of the following description, taken in connection with the accompanying drawings, in which:

FIG. 4 is a side elevational view of the structure shown in FIG. 3, in the storage position prior to release of a stored bale of hay; and FIG. 5 is a view similar to FIG. 4 but shown at the moment of trap door release when the trap door has begun to swing downwardly.

DETAILED DESCRIPTION OF THE INVENTION

Figure 1:
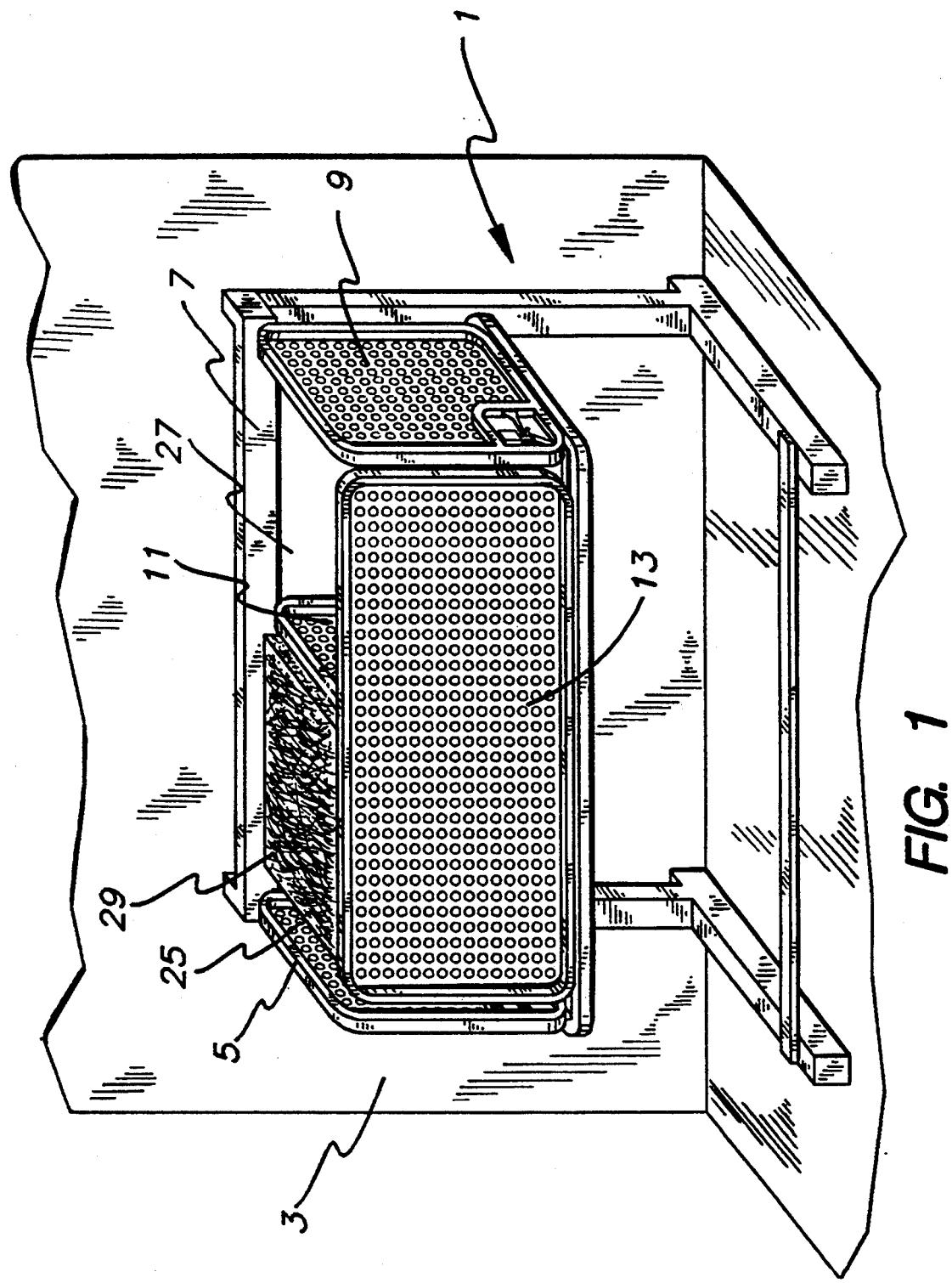
FIG. 1 is a top, front and side perspective view of a dispenser for bales of hay, according to the present invention, in the position it occupies prior to dispensing a bale of hay.
Figure 2:
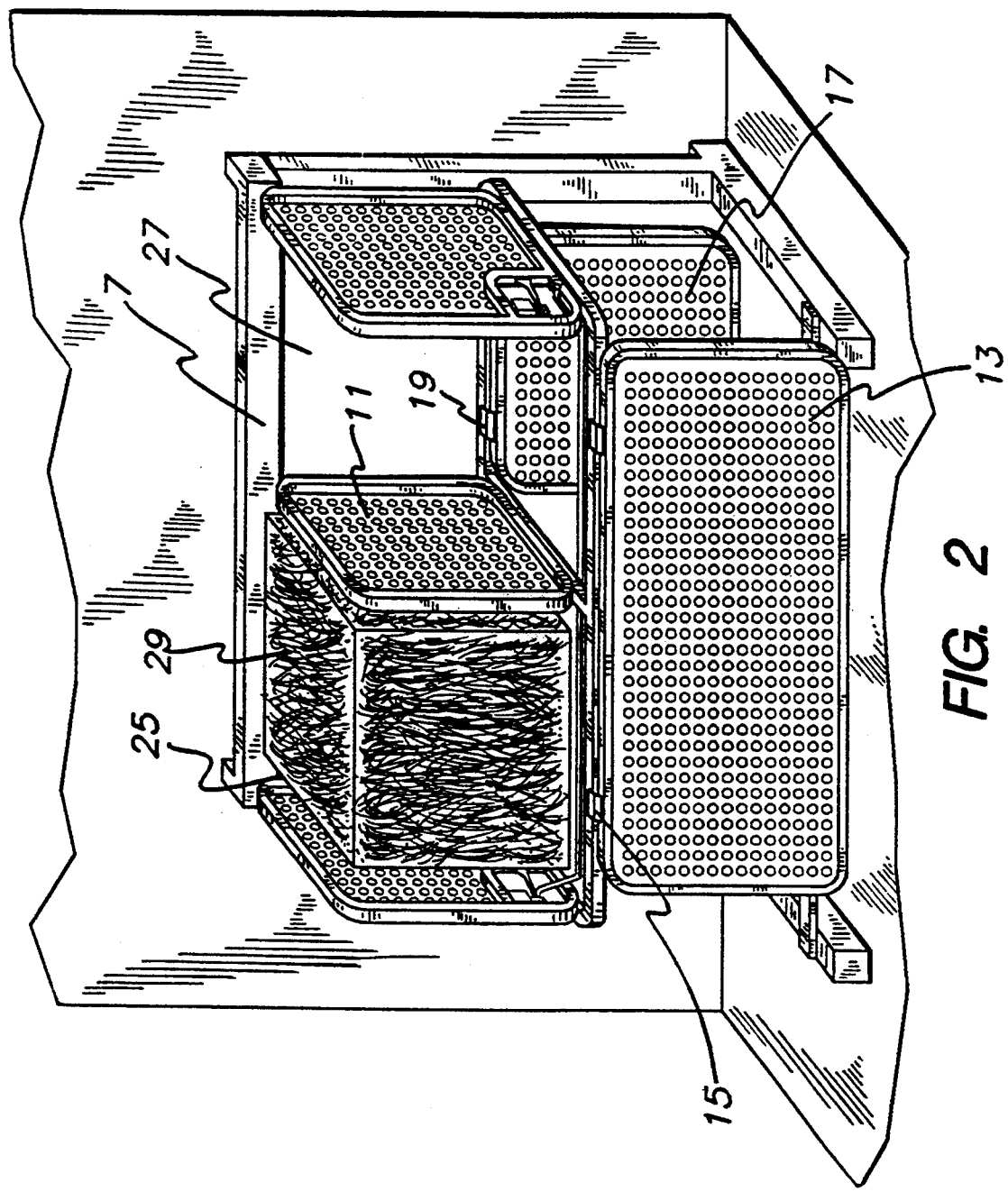
FIG. 2 is a view similar to FIG. 1, but showing the front of the dispenser open and one of the trap doors sprung.

Referring now to the drawings in greater detail, and first to FIGS. 1 and 2 thereof, there is shown a dispenser for bales of hay, according to the present invention, indicated generally at 1, mounted an appropriate distance above the ground on the side of a wall 3. This wall mounting of the dispenser of the present invention ensures that the ground below the dispenser will be free for other uses, so that the dispenser of the present invention does not withdraw any space from what would otherwise be its normal use.

Dispenser 1 is removably secured to wall 3 by any conventional fasteners (not shown) such as screws, bolts, hooks, etc.

Dispenser 1 comprises a frame 5 make up of upper and lower rear horizontal bars 7. Because the dispenser 1 is wall-mounted, the rear of the dispenser can be open, as it is closed by the wall against which the dispenser is retained.

Dispenser 1 also comprises vertical side walls 9 at either end thereof, and, in the illustrated embodiment, a single vertical partition 11 parallel to and spaced equidistantly between side walls 9.

A single front door 13 is mounted on frame 5 by hinges 15 for vertical swinging movement between the positions shown in FIGS. 1 and 2. A lock or latch (not shown) releasably retains door 13 in the FIG. 1 position.

Side walls 9, partition 11, front door 13 and trap doors 17 are closed by paneling 23, thereby to define two compartments 25 and 27 for the reception of bales of hay 29. No such paneling need be provided above the bales, to close the top of the dispenser, provided the dispensers are mounted sufficiently high that the animals do not have access to the hay from above.

Figure 3:
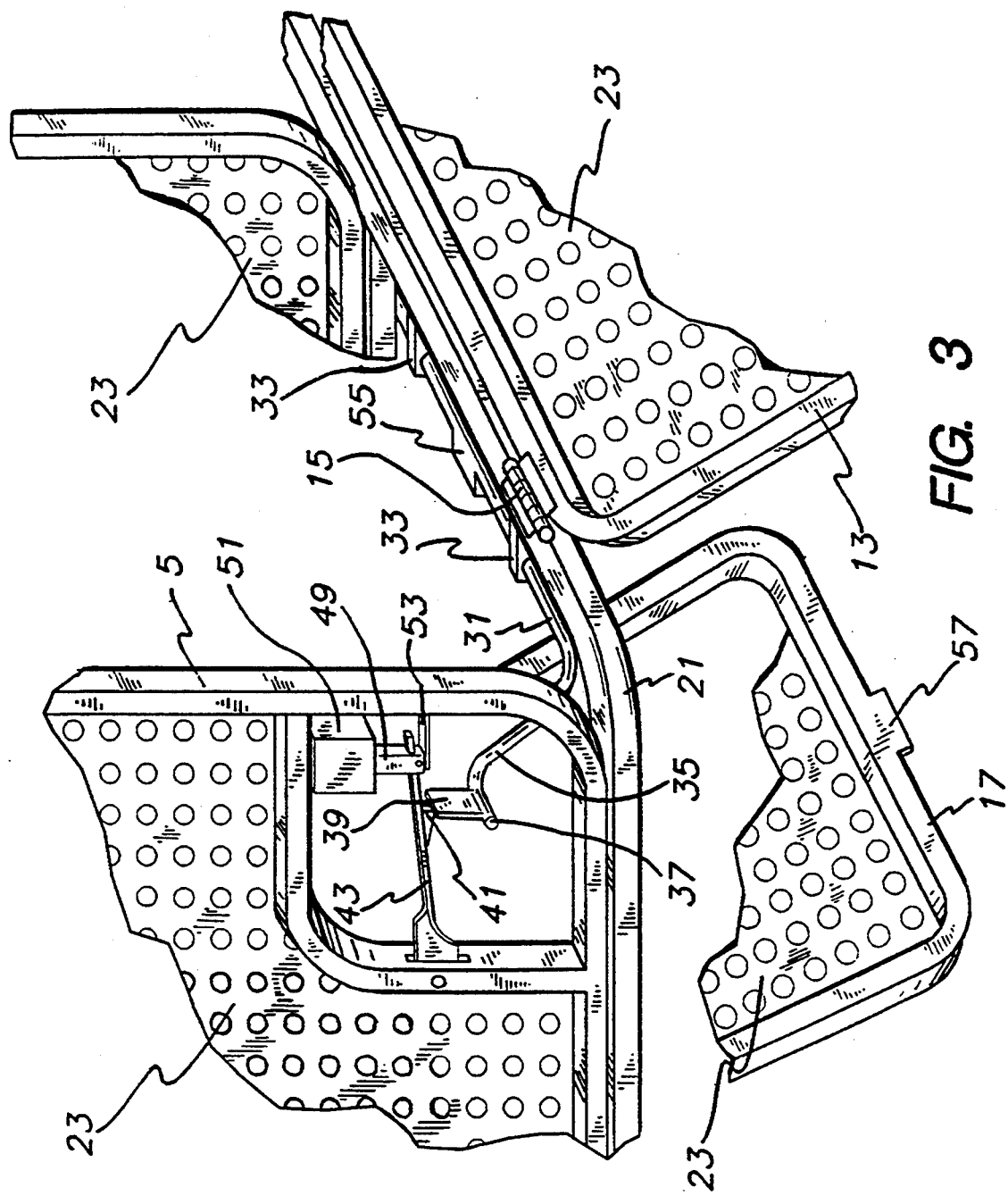
FIG. 3 is an enlarged fragmentary perspective view of the trap door release mechanism of the present invention.

Turning now to FIGS. 3–5, it will be seen that a horizontal rod 31 is mounted for rotation on and parallel to the lower bar 21 at the front of dispenser 1. There is one such rod 31 per compartment, each mounted in two spaced coaxial brackets 33 on the inner side of that forward lower bar 21. At one end of each rod 31 is an integral arm 35 formed from the rod 31 by bending and disposed at right angles to the remainder of rod 31, each arm 35 terminating in an end 37 which in turn is bent back into parallelism with the major portion of rod 31 and, in the illustrated embodiment, extends toward the laterally outward side of the associated compartment.

Each end 37 carries an upstanding detent 39, which coacts with a stop 41 carried by a latch 43 mounted for vertical swinging movement about a pivot 45 on a portion of frame 5. The end of latch 43 opposite pivot 45 is connected by a pivot 47 for vertical swinging movement relative to the plunger 49 of a solenoid 51. When solenoid 51 is inactivated, plunger 49 rests by gravity on a lower stop 53 fixed to frame 5, which is the FIG. 4 position of the parts. However, when solenoid 51 is actuated, plunger 49 is raised, which is the FIG. 5 position of the parts.

A lug 55 is fixed to and extends radially outwardly of rod 31 between brackets 33. A lug 57 extends horizontally forwardly from trap door 17. When lugs 55 and 57 are both horizontal, they have end portions that overlie each other, that is, the end portion of lug 57 overlies the end portion of lug 55, as seen in FIG. 4.

Rod 31, and with it the arm 35, is rotatable between the positions of FIGS. 4 and 5, with the result that in the FIG. 4 position, in which the solenoid 51 is inactivated and the plunger 49 rests by gravity on stop 53, detent 39 engages stop 41, which stop 41 prevents arm 35 from swinging counterclockwise. But in the FIG. 5 position, when solenoid 51 is activated and plunger 49 is raised, stop 41 rises until it no longer engages detent 39, and hence no longer prevents counterclockwise swinging movement of arm 35 to the FIG. 5 position, wherein end 37 of arm 35 comes to rest against frame 5.

The actuation of solenoid 51 is under control of a timer 61 whose function can be preset in known fashion, to give a timed series of pulses to the solenoids 51.

The operation of the dispenser of the present invention is as follows:

It is to be understood that the parts just described are present not only at the right of FIGS. 1 and 2 as shown, but also at the left of FIGS. 1 and 2 (not shown). Thus, the structure shown to the left of partition 11 in FIGS. 1 and 2 is the mirror image of that shown to the right of partition 11 in FIG. 2.

The operation of the dispenser according to the present invention is as follows:

Let it be assumed that the parts are all in the position shown at the right of FIG. 2, that is, the front door 13 is open and all the trap doors 17 are in their downwardly swung position. This is also the FIG. 5 position of the parts, the trap door 17 being shown only partially downwardly swung in FIG. 5 for clarity of illustration. In other words, let it be assumed that the dispenser is in the position in which all of its compartments have been sequentially emptied by the operation of timer 61, whose sequence and interval is preprogrammable by conventional means.

First the trap door 17 is swung upwardly to the FIG. 4 position, that is, in which it is horizontal. Rotatable rod 31 with arm 35, however, is in the FIG. 5 position, so that the lug 55 is directed downwardly. This permits the lug 57 on trap door 17 to clear lug 55 when rising to the FIG. 4 position.

While holding the trap door 17 closed, that is, in the FIG. 4 position, with one hand, the operator grasps arm 35 or end 37 thereof with the other hand and moves it from the FIG. 5 position clockwise to the FIG. 4 position. In the meantime, latch 43 is in the FIG. 4 position, because solenoid 51 is not actuated. Detent 39 then strikes the inclined undersurface of stop 41, camming latch 43 toward the FIG. 5 position. Because the solenoid plunger 49 rests merely by gravity on lower stop 53, latch 43 can swing a small distance counterclockwise, until detent 39 overrides the edge of stop 41, after which stop 41 and latch 43 and solenoid plunger 49 fall by gravity to the FIG. 4 position, which downward movement is limited by lower stop 53. The parts are now in their FIG. 4 position.

Notice that, in the FIG. 4 position, the arm 35 when swinging clockwise has rotated rod 31 to which it is attached, also clockwise, so that lug 55 on rod 31 swings clockwise to the FIG. 4 position in which it directly underlies and supports lug 57 on trap door 17.

The operator can then release both hands, because trap door 17 will be held in the FIG. 4 position by the support given to its lug 57 by lug 55 on rod 31; and rod 31 cannot rotate counter-clockwise, because the interengagement of stop 41 and detent 39 prevents this.

In this condition of the parts, that is, the FIG. 4 position, with front door 13 open, the dispenser can then be filled with bales or half bales of hay, one per compartment. Front door 13 is then swung up to its closed position, and either latched or locked by releasable means not shown. Timer 61 is then set by the operator, as to the time of the first dispensing operation and the interval between dispensing operations, according to the number of compartments containing bales of hay to be dispensed.

When the time has elapsed to the first dispensing operation, timer 61 actuates one of the solenoids 51, which raises its plunger 49 which raises latch 43 until stop 41 rises above detent 39. The weight of the bale of hay on trap door 17 causes lug 57 to press down on lug 55 with a force sufficient to rotate rod 33, thereby to swing arm 35 downwardly until end 37 thereof contacts stop 59 on frame 5. This permits lug 55 to swing counterclockwise a sufficient distance, to the FIG. 5 position, that lug 57 now clears lug 55 and trap door 17 drops open, dispensing the bale of hay.

This operation continues at the desired intervals controlled by timer 61, e.g. once a day, until all of the bales of hay have been dispensed. If there are, say, eight compartments, then the owner can absent himself for, say, eight days without having to attend to the feeding of his animal or animals.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are accordingly considered to be within the purview and scope of the present invention as defined by the appended claims.

What is claimed is:

1. A dispenser for bales of hay, comprising a fixed frame defining a compartment adapted to receive a bale of hay and a trap door mounted for vertical swinging movement about a horizontal axis on the frame between a raised position in which the trap door serves as a bottom for the compartment and is adapted to support a bale of hay in the compartment, and a lowered position in which the bale of hay is dispensed from the bottom of the compartment, a rod mounted for rotation on the frame about an axis parallel to said horizontal axis, a lug on the trap door engageable with a lug on the rod when the rod is rotated to a first position, said lugs being out of engagement with each other and the trap door free to fall when the rod is rotated to a second position, means releasably retaining the rod in said first position, a solenoid having a plunger which is moved upon actuation of the solenoid, means responsive to movement of the plunger to disable said retaining means thereby to permit the lug on the trap door to press downward and disengage from the lug on the rod thereby to rotate said rod from said first position to said second position and to permit the trap door to fall open to dispense the bale of hay, and a timer for selectively predetermining the time of actuation of said solenoid, said solenoid plunger being vertically oriented and falling by gravity to a position in which said disabling means retains said rod in said first position, said disabling means comprising a vertically swingable latch that is raised by upward movement of said plunger upon actuation of said solenoid, said latch comprising an arm having a stop affixed thereto pivotally connected to said plunger, and said retaining means comprising a detent attached to said rod for engagement with said stop to retain said rod in said first position when said latch is lowered and said stop and detent are in engagement with each other and to permit the rod to rotate to said second position upon actuation of the solenoid to raise the plunger to raise the latch to disengage the stop and detent from each other.

2. A dispenser as claimed in claim 1, the rotatable rod terminating in an arm extending transversely of the rod, the detent being carried by an end of said arm at a distance from the axis of rotation of the rod, said arm swinging vertically upon rotation of said rod between said first and second positions.

* * * * *